United States Patent
Mutschler et al.

(10) Patent No.: US 9,488,499 B2
(45) Date of Patent: *Nov. 8, 2016

(54) TRANSMISSION AND RECEPTION UNIT ON A TRANSPARENT CIRCUIT BOARD FOR A ROTATIVE ENCODER

(71) Applicant: SICK STEGMANN GmbH, Donaueschingen (DE)

(72) Inventors: Reinhold Mutschler, Donaueschingen (DE); David Hopp, Donaueschingen (DE)

(73) Assignee: SICK STEGMANN GMBH, Donauschingen (DE)

( * ) Notice: Subject to any disclaimer, the term of this patent is extended or adjusted under 35 U.S.C. 154(b) by 548 days.

This patent is subject to a terminal disclaimer.

(21) Appl. No.: 13/952,045

(22) Filed: Jul. 26, 2013

(65) Prior Publication Data

US 2014/0034819 A1    Feb. 6, 2014

(30) Foreign Application Priority Data

Jul. 31, 2012   (EP) .................................... 12178690

(51) Int. Cl.
  *G01D 5/34*   (2006.01)
  *H01J 5/02*   (2006.01)
  (Continued)

(52) U.S. Cl.
  CPC .............. *G01D 5/345* (2013.01); *G01B 11/26* (2013.01); *G01D 5/3473* (2013.01); *G01D 5/34715* (2013.01)

(58) Field of Classification Search
  CPC ........... G01D 5/34715; G01D 5/3473; G01D 5/347; G01D 5/344; G01D 5/34723; G01D 5/38; G01B 11/26; G01B 11/272; G01B 11/00
  USPC ................ 250/231.1, 231.13, 216, 225, 226, 250/237 R, 237 G, 239; 341/13, 14; 356/615, 616, 618, 620, 621, 622; 33/1 PT, 1 N, 1 M
  See application file for complete search history.

(56) References Cited

U.S. PATENT DOCUMENTS 3,561,846 A * 2/1971 Kingsland .............. H04N 1/029
                                                      250/228
4,115,701 A * 9/1978 Guichard ................ G01S 17/08
                                                      250/216
(Continued)

FOREIGN PATENT DOCUMENTS

DE       3220560 A1   12/1982
DE    201 02 192 U1    6/2001
(Continued)

OTHER PUBLICATIONS

International Search Report issued in EP 12 178 690.9-1860 dated Nov. 7, 2014, 5 pages.
(Continued)

*Primary Examiner* — Que T Le
*Assistant Examiner* — Jennifer Bennett
(74) *Attorney, Agent, or Firm* — Nath, Goldberg & Meyer; Jerald L. Meyer

(57) ABSTRACT

The invention relates to a transmission and reception unit for the detection of a rotary angle, having a light transmitter for the transmission of transmitted light to a dimensional scale and having a light receiver which lies on a support, the light receiver having a front side for the reception of reception light influenced by a dimensional scale disposed opposite the front side and having a rear side which is supported on a support transparent for the transmitted light. In order to provide a new assembly concept for the positioning of the light source and of the receiver and in particular to provide an arrangement which is as symmetrical as possible it is suggested that the transparent support is arranged between the light receiver and the light transmitter and that a light deflection apparatus is provided for the deflection of the transmitted light.

20 Claims, 7 Drawing Sheets

Figure 1:
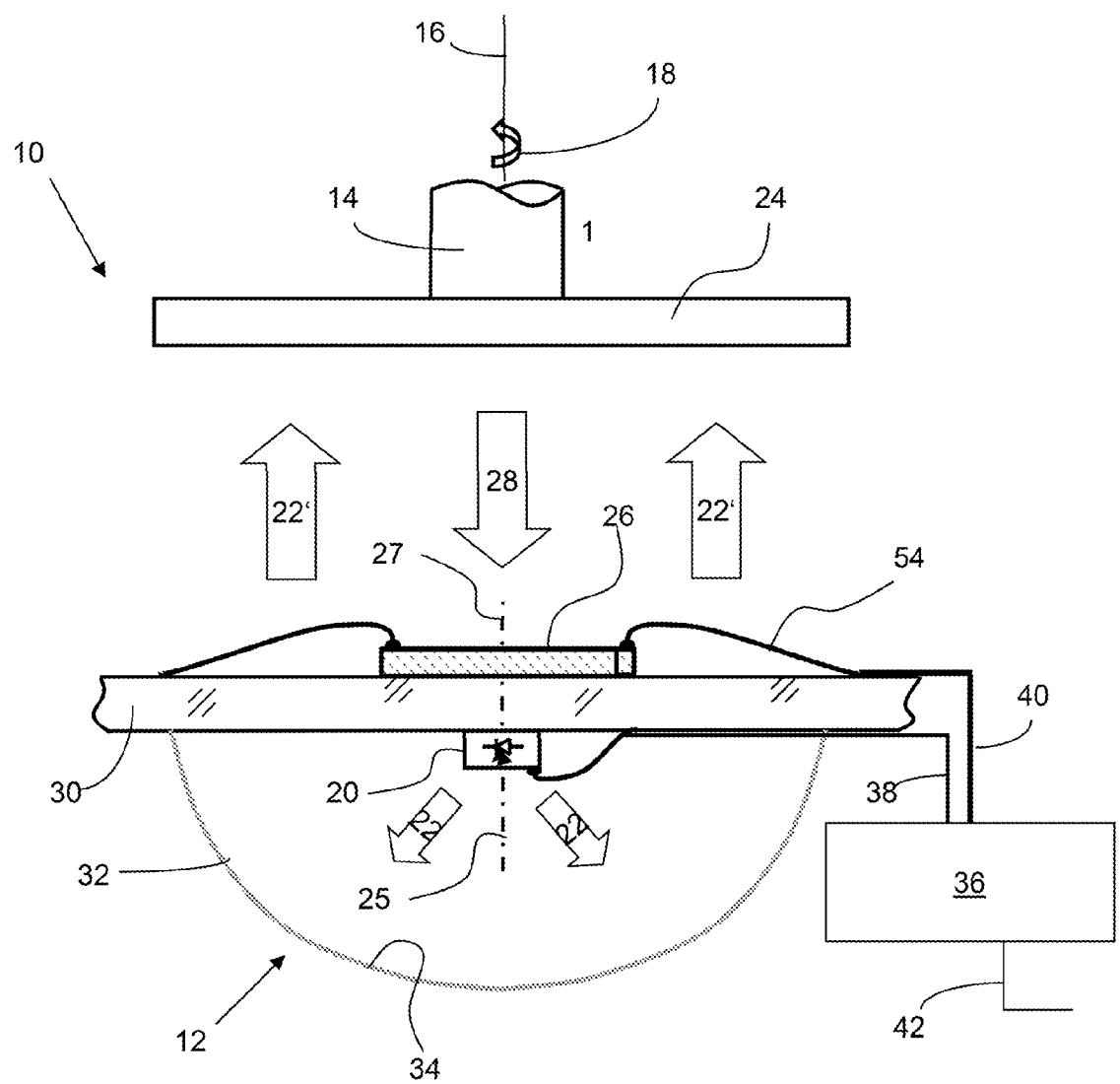
Figure 2:
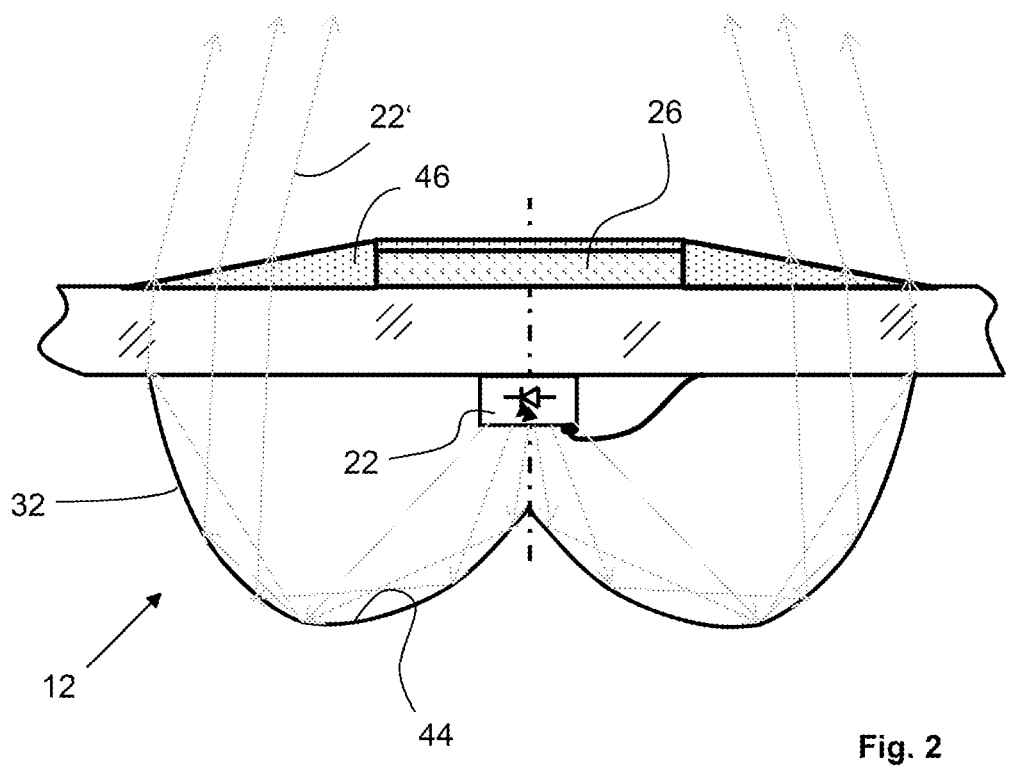

(51) Int. Cl.
*G01B 11/26* (2006.01)
*G01D 5/347* (2006.01)

(56) References Cited

U.S. PATENT DOCUMENTS

| | | | | |
|---|---|---|---|---|
| 4,499,374 | A * | 2/1985 | Kabaya | G01D 5/34715 250/237 G |
| 5,479,010 | A * | 12/1995 | Shimomura | G01D 5/34715 250/231.13 |
| 5,498,870 | A * | 3/1996 | Ishizuka | G01D 5/38 250/231.16 |
| 5,534,693 | A * | 7/1996 | Kondo | G01D 5/38 250/231.16 |
| 5,640,008 | A * | 6/1997 | Bosch | G01D 5/34715 250/237 G |
| 5,774,219 | A * | 6/1998 | Matsuura | H03M 1/301 250/237 G |
| 5,995,229 | A * | 11/1999 | Omi | G01D 5/34715 33/707 |
| 6,437,323 | B1 * | 8/2002 | Franz | G01D 5/34715 250/231.13 |
| 6,794,638 | B2 * | 9/2004 | Aoki | G01D 5/3473 250/231.13 |
| 7,034,282 | B2 * | 4/2006 | Oka | G01D 5/34715 250/216 |
| 7,777,879 | B2 | 8/2010 | Baxter et al. | |
| 9,103,698 | B2 * | 8/2015 | Hopp | G01D 5/345 |
| 2002/0018220 | A1 * | 2/2002 | Aoki | G01D 5/347 356/614 |
| 2002/0021450 | A1 * | 2/2002 | Aoki | G01D 5/34715 356/499 |
| 2002/0039463 | A1 * | 4/2002 | Degertekin | G01D 5/38 385/12 |
| 2004/0027690 | A1 * | 2/2004 | Takahashi | G02B 6/29308 359/726 |
| 2011/0101209 | A1 | 5/2011 | Benner, Jr. | |
| 2012/0081711 | A1 * | 4/2012 | Benner | G01D 5/34715 356/614 |
| 2013/0037705 | A1 * | 2/2013 | Soo | G01D 5/34715 250/231.13 |

FOREIGN PATENT DOCUMENTS

| | | |
|---|---|---|
| DE | 100 05 277 A1 | 8/2001 |
| EP | 0 218 778 A1 | 4/1987 |
| EP | 0646796 A1 | 4/1995 |
| EP | 1 507 137 A1 | 2/2005 |
| EP | 2 372 314 A2 | 10/2011 |
| WO | 2004/094957 A1 | 11/2004 |

OTHER PUBLICATIONS

European Search Report dated Dec. 18, 2012 in the counterpart European Application No. 12 17 8690, six pages.

* cited by examiner

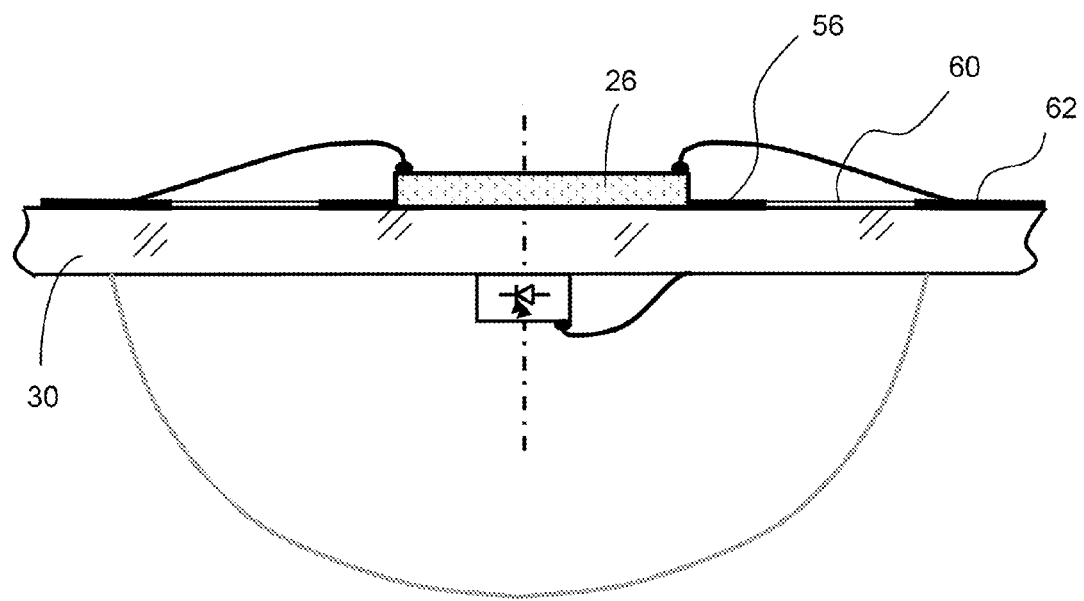
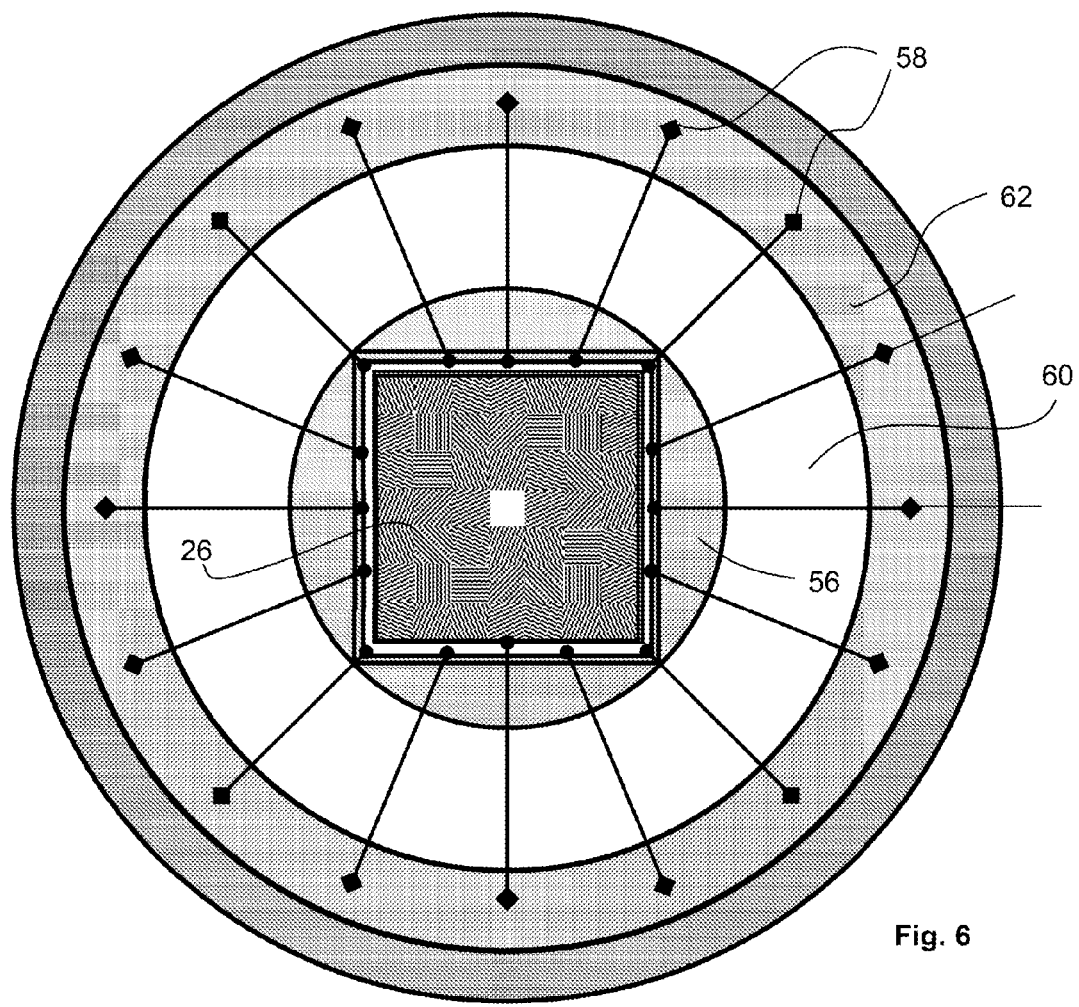
Fig. 5
Fig. 6

TRANSMISSION AND RECEPTION UNIT ON A TRANSPARENT CIRCUIT BOARD FOR A ROTATIVE ENCODER

The invention relates to a transmission and reception unit for the detection of a rotary angle as well as to a rotary actuator working therewith.

For the detection of a rotary angle, for example of a shaft, optical work principles are used, amongst other things. Independent of the respective optical principle corresponding sensors are composed of at least one light source, a dimensional scale and a receiver. The dimensional scale generates an intensity modulation of the signal at the receiver via a relative movement with regard to the receiver which intensity modulation serves as an angular signal. Two basic construction variants are used; transmissive and reflexive. In particular, the reflexive design in which the optical path is reflected at the dimensional scale has particular advantages, since namely then a transmitter and the receiver can be arranged at the same side, for example, on the same electronic card. In this way a real decoupling of a rotary actor and a rotating shaft is possible. The rotary actor must merely still "see" the shaft.

In many applications the distance between the dimensional scale and the sensor unit varies over a large range. For this reason it is advantageous to illuminate the dimensional scale, which in the case of a polarization encoder is configured as a polarizer, as parallel and as symmetrical as possible with respect to its rotational axis and symmetrical with respect to the sensor structure of the receiver and having an introduction of light which is as perpendicular as possible with respect to the detector plane. Ideally the receiver and the light transmitter should be arranged at the illumination axis and/or at the rotary axis for this purpose.

The design of a reflexive optical path represents a challenge since the individual components, in particular the transmitter and the receiver cannot be aligned directly along an optical axis.

For this reason, on the construction of reflective optical functional principles for rotary angle sensors, attempts are made to place the illumination, the dimensional scale (polarizer) as well as the receiver centrically on an optical axis. This requires the central placement of the light source. A central placement of the light source in turn requires a placement of the receiver outside of the optical axis. A symmetry only results then when a plurality of light receivers are positioned around the light source or when the light is deflected. For this purpose, however, beam splitters, mirror systems or the like are required which have to be adjusted. In such systems the individual components are arranged in different planes of assembly. The positioning and/or the alignment of the optical components in a system having a plurality of planes of assembly is demanding in effort and is cost intensive. Likewise the reflection of the illumination optical path is complicated and is frequently associated with considerable intensity losses. Furthermore, such an assembly requires considerable construction space.

From the US 2011/0101209 A1 a transmission and reception unit of this kind is known.

Starting therefrom it is the object of the invention to provide a new assembly concept for the positioning of the light source and the receiver in which the previously mentioned disadvantages can be avoided, i.e. in particular to provide an arrangement which permits an optical path which is approximately parallel to the axis of rotation of the sensor as well as symmetric to the receiver and does not illustrate a limitation for the minimization of the chip surface of the polarization sensor and at the same time enables a compact assembly of the sensor module.

This object is satisfied by a transmission and reception unit having the features of claim 1 and by a rotary actor for the detection of a rotary angle having the features of claim 20.

A transmission and reception unit in accordance with the invention for the detection of a rotary angle comprises a light transmitter for the transmission of transmitted light to a dimensional scale and a light receiver having a front side for the reception of reception light influenced by the dimensional scale lying opposite of the front side and having a rear side at which a support transparent for the transmitted light lies. The transparent support is arranged between the light receiver and the light transmitter and a light deflection unit for the deflection of transmitted light is provided.

An essential advantage of the invention is the thus possible symmetrical construction such that light transmitter and light receiver can be substantially collinearly arranged so that a compact smaller assembly is ensured without a plurality of planes of assembly being necessary. Only a few components are required for this purpose. Light transmitter and light receiver are integrated into a unit which is very easily handlable.

The transmission and reception unit in accordance with the invention having the receiver and/or the receiver chip and the integrated light transmitter can be flexibly used as a modulation of an optical signal and for different optical functional principles. An interfering direct illumination of the receivers by the light transmitter is practically excluded.

Further advantages are a capsulation of the illumination and the beam formation, a very good scattered light and interference light suppression and a good heat discharge for the light transmitter.

In order to achieve ideal measurement results the transmitted light is guided around the light receiver in the direction toward the dimensional scale rotationally symmetric with regard to the optical axis.

In a constructive symmetrical and therefore easily adjustable configuration the optical axes of light transmitter and light receiver lie collinear.

When the transmitted light is deflected by means of surfaces formed as reflective, in particular free form surfaces which lie opposite the light transmitter, an active influence of the illumination characteristics is also possible in this way, due to the free form surfaces, apertures and the like. Likewise a larger use light portion can be achieved at the dimensional scale and/or also at the light receiver by bundling the different angular regions of the emitted light (caustic).

Alternatively the transmitted light can be guided by means of a light guide.

For protecting the light receiver this can be kept in an optically transparent material layer in a known manner, wherein the material layer advantageously has beam forming properties for the transmitted light.

For increasing symmetry and in this way for improving the measurement result, in particular for polarization encoders, at least one light impermeable, preferably circular masking, is arranged between the light transmitter and the light receiver in an embodiment.

Advantageously the transparent support is composed of glass.

In an embodiment of the invention the support has specifically shaped surfaces so that it can also take on a lens function and therefore further separate optical components for the reception light can be saved.

The same is true when the support is configured as an optical filter for wavelength selection and/or has diffractive structures for diffraction, deflection or dispersion of the light and/or additionally brings about a polarization of the light.

The light receiver is advantageously configured as a receiver array in a CCD or in a CMOS manner of construction and the light transmitter is configured as an LED, an LED chip, a laser diode or a laser chip, wherein the light receiver preferably includes a signal processing and a signal interface and preferably as a one chip system (SOC, system on a chip) also includes a microcontroller, programming logic or other complex circuits.

Advantageously, the transmission and reception unit in accordance with the invention is used with a rotary actor for the measurement of the rotary angle of two objects rotating relative to one another.

Particularly preferably the invention can be used with rotary angle sensors which determine the rotary angle in accordance with the polarization optical principle and in which the optical path is of reflexive design. For this purpose, the rotary actor has a polarizer which rotates relative to the light source and forms a dimensional scale. At the polarizer, the transmitted light is reflected and passes through a polarizing analyzer. The receiver has at least two reception elements preferably the receiver is configured as a light receiver array whose individual receiver elements are respectively provided with polarization structures serving as an analyzer which have different polarization directions. Through evaluating the so obtained signals of the reception elements a rotary angle and a rotary direction can be incrementally determined. Optionally, the light source and the light receiver are combined with light conducting, beam forming or imaging optical elements in the form of lenses, or microstructures such as microlens arrays or DOEs and reflectors in order to improve the properties of the rotary angle sensor.

In order to achieve a uniqueness over 360° the polarizer can be configured as a disc having a normal, with the normal forming an angle different from zero with respect to the rotary axis.

The invention will be described in the following in detail by means of embodiments with reference to the drawing. In the drawing there is shown:

FIG. 1 a schematic illustration of the essential components of a rotary actor in accordance with the invention having a transmission and reception unit in accordance with the invention;

FIGS. 2 to 5 further embodiments of the transmission and reception unit;

FIG. 6 a top view onto the embodiment in accordance with FIG. 5;

FIGS. 7 to 11 further embodiments of the transmission and reception unit.

A rotary actor 10 in accordance with the invention comprises a transmission and reception unit 12 in accordance with the invention for the detection of a rotary angle of a shaft 14 which rotates about a rotary axis 16 in the direction of the arrow 18. The rotary actor 10 is arranged in a rotationally fixed manner and can determine the rotation of the shaft in this embodiment in accordance with the polarization optical principle.

The transmission and reception unit 12 has a light transmitter 20 for the transmission of transmitted light 22 which finally illuminates a dimensional scale 24, as well as a light receiver 26 for the reception of reception light 28 influenced by the dimensional scale 24.

The light receiver 26 is preferably configured as a light receiver array having a plurality of reception elements in a CCD or CMOS manner of construction. It has a front side for the reception of the reception light and a rear side at which a support 30 transparent for the transmitted light 22 lies, is e.g. adhesively bonded too. The transparent support 30 is arranged between the light transmitter 20 and the light transmitter 26 and is preferably formed planar parallel from glass. In this connection the light transmitter 20 and the light receiver 26 are arranged with respect to one another in this embodiment so that their respective optical axes 25 and 27 are collinear and preferably, as illustrated in FIG. 1, also coincide with the rotary axis 16. The more symmetric the arrangement the better the measurement results can be achieved therewith.

The light transmitter 20 is arranged at the side disposed opposite the light receiver 26 (lower side in FIG. 1), for example adhesively bonded thereto and then radiates the transmitted light 22 into a direction which points away from the dimensional scale 24 (in the FIG. 1 downwardly). So that the transmitted light 22 can even be deflected in the direction of the dimensional scale 24 a light deflection apparatus 32 is provided which is composed of a parabolic-like mirror 34 in the simplest embodiment (FIG. 1). The light deflection apparatus 32 deflects the transmitted light 22 about the light receiver 26 in the direction 22' onto the dimensional scale 24. In this connection the transmitted light 22 is guided in a rotationally symmetric manner with respect to the optical axis. The light transmitter 20 can be an LED, an LED chip, a laser diode or a laser chip.

Furthermore, a control and evaluation unit 36 is provided which, on the one hand, is connected to the light transmitter 20 for controlling the light transmitter 20 via suitable electric connections 38 and, on the other hand, is connected to the light receiver 26 for the voltage supply and for the transfer of the sensor signals as well as of configuration settings via connections 40. In the evaluation unit the signals are evaluated and the results, e.g. in the form of angular values, are output at an output 42 as output signals. So that the electric connections are accessible these must be guided through the transparent region at the boundary of the circuit support. So that this does not negatively influence the illumination by the transmitted light, their number can be minimized through the use of a serial interface for the transfer of the sensor signals and a possibly required configuration interface.

The essential advantage and particular purpose of the transmission and reception unit 12 in accordance with the invention becomes clear on consideration of the thereby equipped rotary actor 10 in accordance with the invention. As an example the functional principle of the rotary actor is described which determines the rotary angle in accordance with the principle of polarization, this means by the detection of a polarization direction.

The light 22 and/or 22' of the light transmitter, which is unpolarized in the case of an LED, is guided around the light receiver 26 as described and is incident at the dimensional scale 24 rotating with the shaft 14 which dimensional scale is configured as a linear polarizer 24. The light 28 reflected by the polarizer 24 then has a linear polarization whose direction corresponds to the current rotary angle of the shaft 14. The reflected light passes through the linear polarization structure arranged in front of the respective reception element and serving as an analyzer and generates a signal which is modulated with the sine of the rotary angle of the polarizer 24 with regard to the analyzer in the respective reception element serving as a light receiver. If a plurality of reception elements are used whose associated polarization structure have an angular shift with respect to one another then a plurality of signals phase shifted with regard to one another are generated which are shifted e.g. by 90° with respect to one another, when the concerned polarization structures are rotated by 45° with respect to one another. A rotary angle and a rotary direction can be calculated in a manner known per se from the phase shifted signal.

In principle, such a detection of the rotary angle of two objects rotating relative to one another about a rotary axis with the aid of the polarization properties of light is known. Examples of such apparatuses are shown in DE 100 05 277 A1, DE 201 02 192 U1, EP 2 187 78 A1, EP 1 507 137 A1 or U.S. Pat. No. 7,777,879.

In the embodiment in accordance with FIG. 1 the support 30 is configured as a planar parallel glass plate. It is also plausible to configure the support non-planar parallel, but rather to provide e.g. spherical lens shapes, aspheric lens shapes, Fresnel lens shapes or the like in order to specifically influence the transmitted light 22, for example to refract this towards the optical axis. Furthermore, the transparent support 30 can be provided with diffractive structures so that a diffraction, deflection, dispersion etc. of the light can be implemented. Likewise polarization properties can be directly integrated into the support. Also a color filter function can be directly provided in the transparent support 30.

Also the light deflection apparatus can have different forms than those described in the embodiment in accordance with FIG. 1. In an example illustrated in FIG. 2 in which the transmission and reception unit 12 are principally of equal design the light deflection apparatus 32 is configured as a free form surface. This is rotationally symmetric and formed so that, if possible, all transmitted light 22 is guided about the light receiver 26 in the direction 22'. Additionally, the light receiver 26 has a transparent material layer 46 known per se which not only protects the bond wires 54, but also has a desired light refracting effect on the transmitted light 22 passing through it.

Instead of the typical use of bond wires a chip assembly with back-sided contacts is advantageous. With the aid of so-called "through silicon vias" 53 (FIG. 4) the electric connections are attached at the rear side of the sensor chip for this purpose which permits the contacting of these like with a ball grid array.

Figure 3:
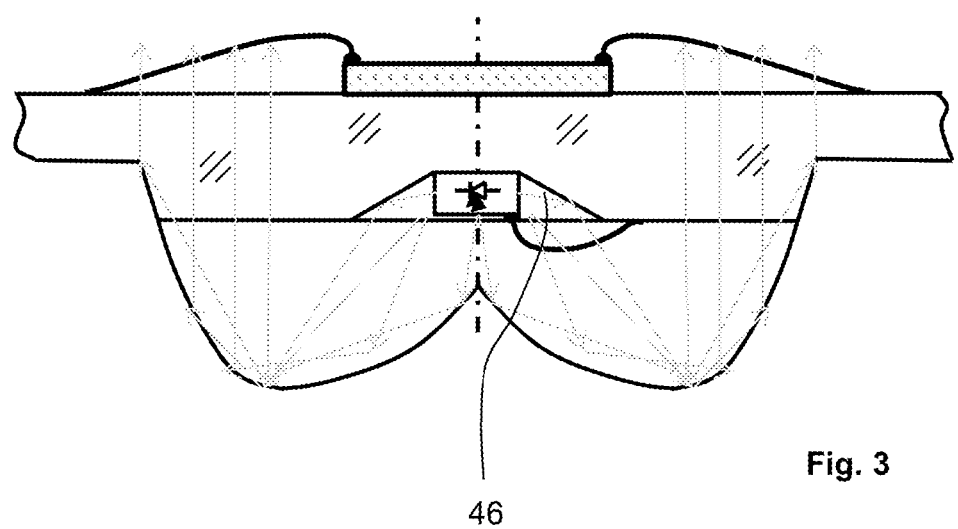

Light transmitters 20, such as an LED, frequently have a very large opening angle for the transmitted light. In order to not loose the laterally radiated light of the LED, the LED can be arranged in a cavity 48 configured as a reflector (FIG. 3). The cavity 48 can be directly integrated into the transparent support and be configured both as a simple cone, as illustrated in FIG. 3, or as a curved surface.

Figure 4:
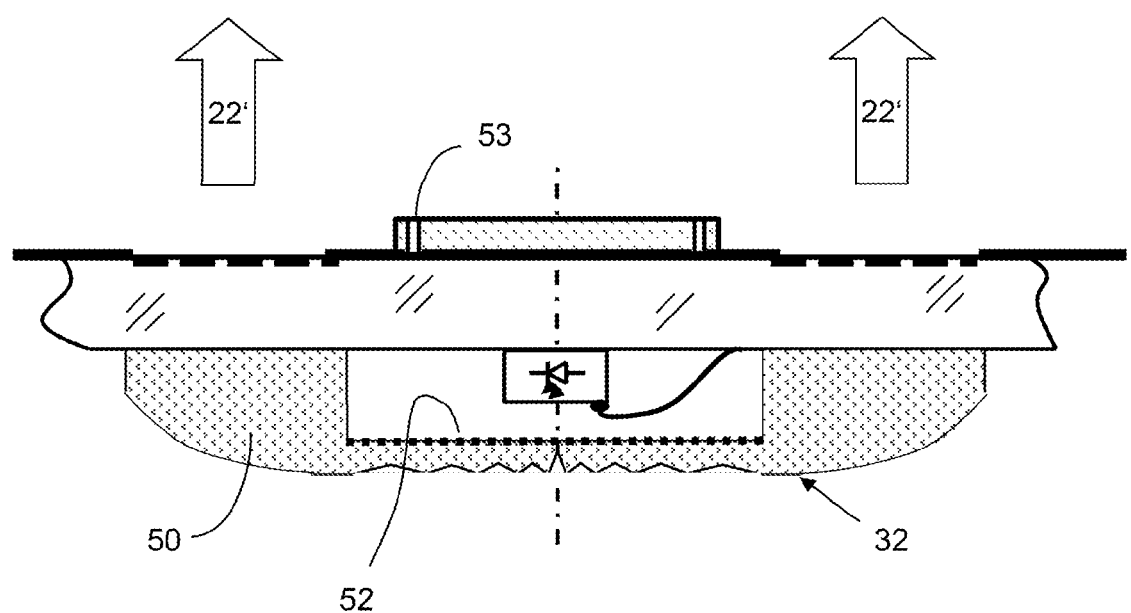
Figure 7:
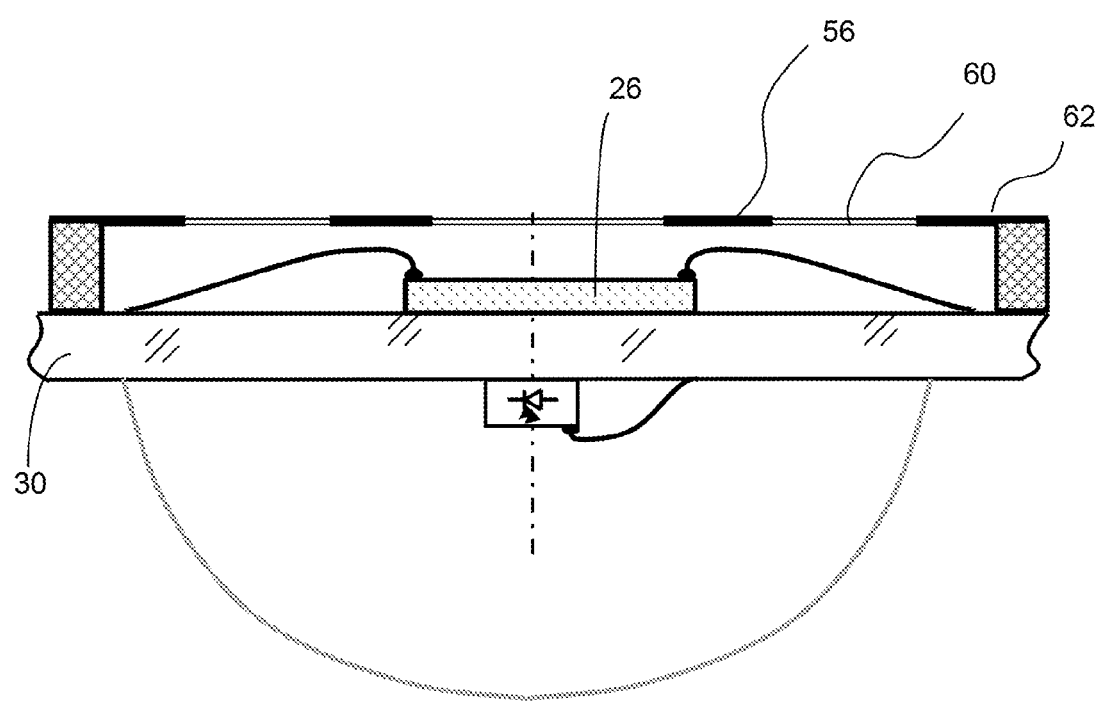

In a further embodiment illustrated in FIG. 4 the light deflection apparatus 32 is configured as a light guide 50 into which the transmitted light is coupled at a surface 52 by means of suitable grid structures and is guided in the light guide 50 such that it experiences the desired deflection direction 22'. It is advantageous to provide the surface with reflection reducing layers or structures at least in the region of the light exit.

If the light receiver 26, as described above, is contacted via bond wires 54, the bond connections are preferably uniformly distributed about the circumference at the light receiver 26 (chip) and the bond wires 54 are preferably guided radially outwardly from the center to bond islands 58 at the transparent circuit support (FIG. 6). Since semiconductor chips are always rectangular their geometry would disturb the symmetry of the illumination. For this reason a round, non-transparent surface (e.g. a metal surface) 56 is provided in an embodiment in accordance with FIGS. 5 and 6 beneath the light receiver chip 26 at the support 30. This also covers the region in which the guiding adhesive required for the chip assembly exits over the edges of the chip and which would otherwise represent an asymmetric non-uniform boundary for the light path.

In a further embodiment the transparent region 60 is surrounded around the round mask 56 by a further round non-transparent cover 62 so that a ring-like light path results for the transmitted light through the transparent remaining region 60. The outer non-transparent cover 62 also masks the slightly larger bond islands 58 at the otherwise transparent support in the case of a contacting of the sensor chip by means of bond wires.

The mask 56 and cover 62 for bounding the light path are attached directly at the transparent support in the embodiment in accordance with FIGS. 5 and 6. In a further embodiment in accordance with FIG. 7 these are placed in a second plane lying above the sensor chip 26.

Due to the physical properties of the polarization the rotary angle dependent signals have at least two periods per rotation about 360° for a polarization encoder, which is why the angular position of the polarizer serving as a dimensional scale cannot be determined in an absolute manner over an overall rotation without further ado. It is lacking in information which would deliver a uniqueness over 360°.

In order to provide such information it is provided in an embodiment of the invention that the mask 56 takes over the task of a shadow throwing mask in the second plane in the central region 60.1 (FIG. 7) which leaves the light receiver open, and partially covers the sensor element lying there beneath. If the polarizer is mounted so that its normal forms an angle together with the rotary axis which angle deviates from zero, the shadow formed by the mask rotates over the reception elements on rotation of the shaft, so that a further intensity modulation is forced onto the measured signals in this way which intensity modulation is periodic over 360° and/or so that signals are generated in separate reception elements modulated sinusoidally and in a cosine-like manner, whereby the missing information for the obtainment of the uniqueness is provided.

Figure 8:
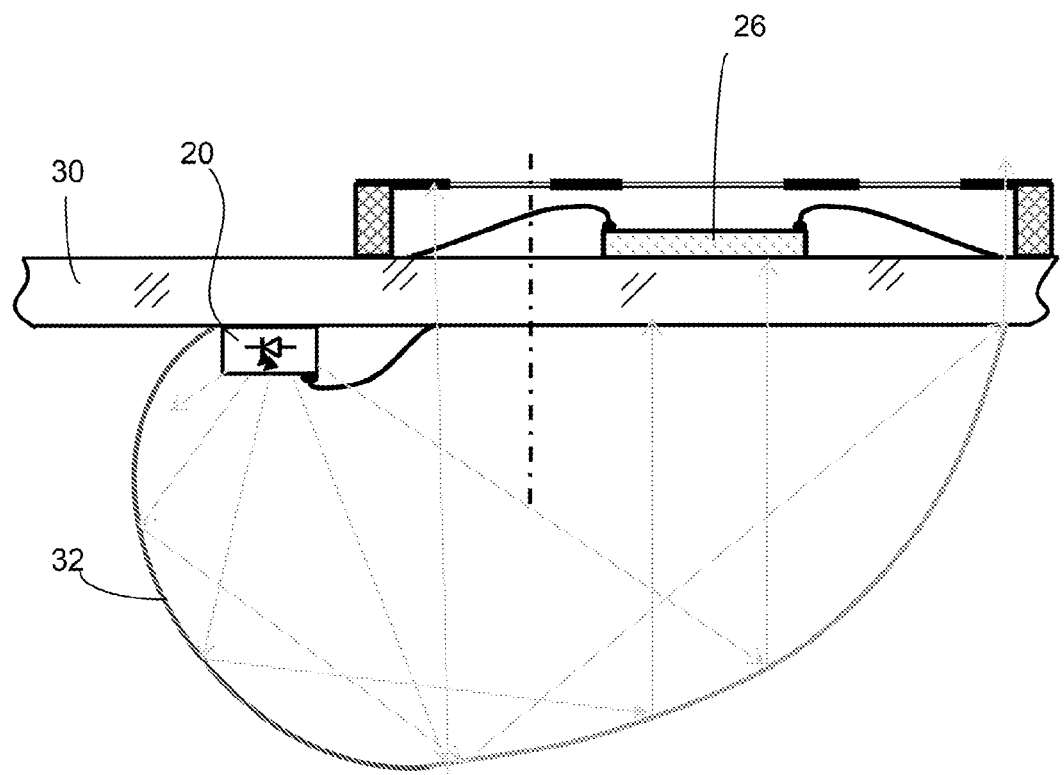

The light source 20 and the receiver 26 must not necessarily lie collinear at an optical axis. FIG. 8 shows an embodiment in which the light receiver 20 is arranged off-centrally at the underside (in accordance with FIG. 8) of the support 30 whose light is, however, guided about the light receiver in accordance with the invention, which in a present case takes place via the light deflection unit 32 as a reflecting free form surface.

Figure 9:
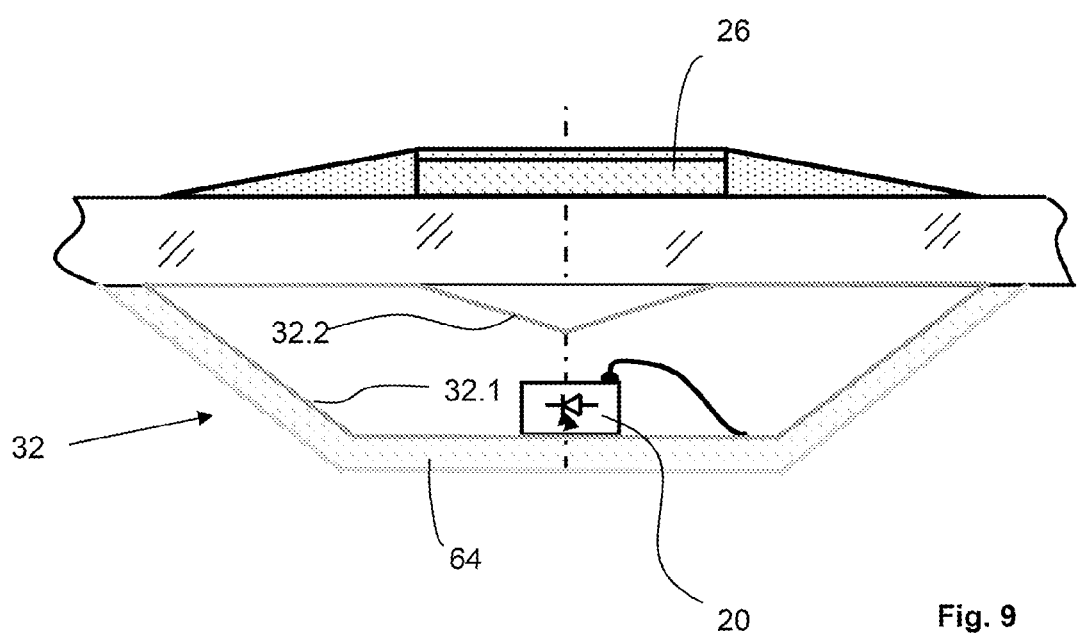
Figure 10:
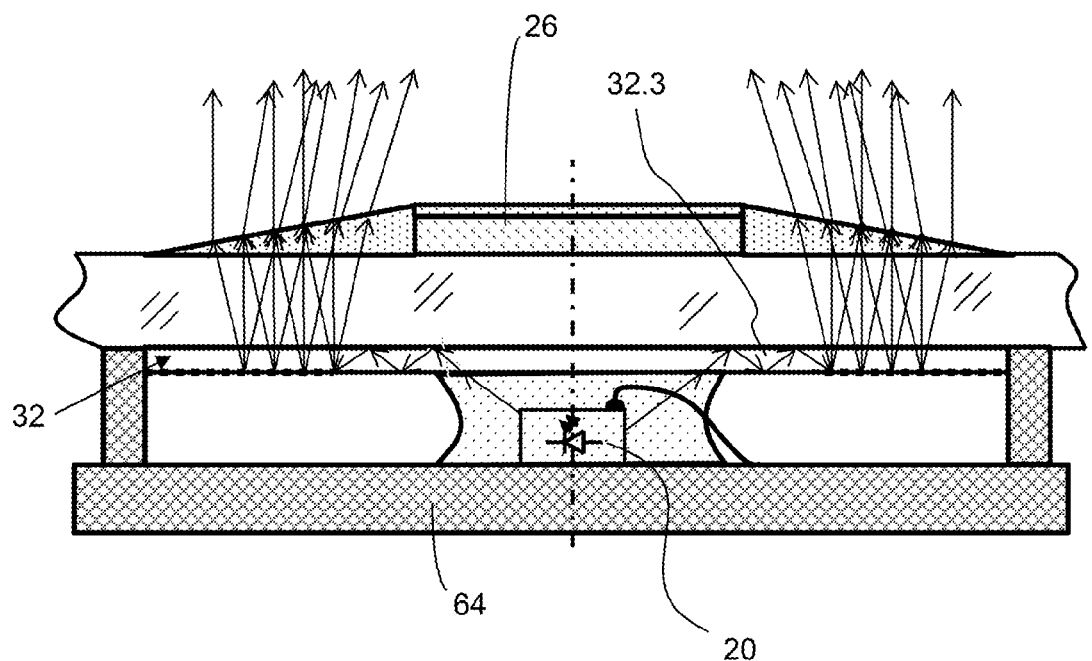
Figure 11:
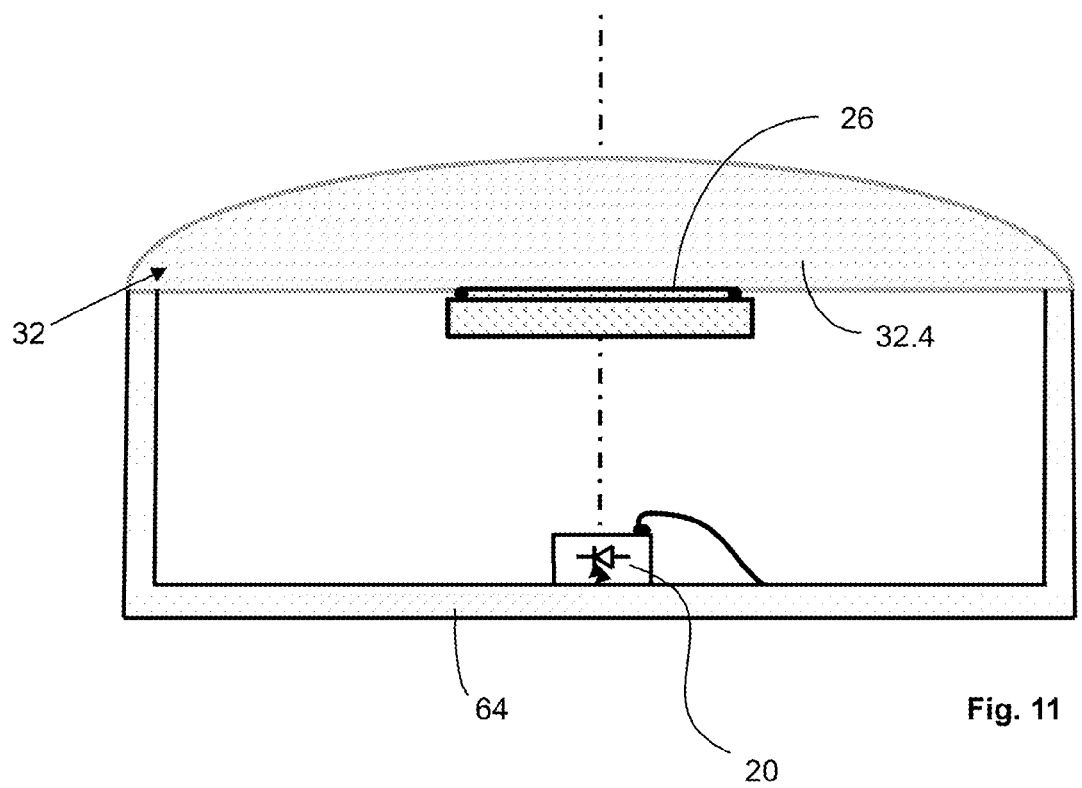

In further embodiments illustrated in the FIGS. 9 to 11 the light transmitter 20 is not assembled on the same support 30 as the light receiver 26, but rather on a substrate 64 arranged beneath the light receiver 26 in such a manner that the light transmitter 20 in principle radiates onto the light receiver backside. A light deflection unit 22 is in turn provided, by means of which the transmitted light 22 is guided around the light receiver in the direction onto the dimensional scale.

In the embodiment in accordance with FIG. 9 this is a reflector 32.1 at whose base the light transmitter 20 is arranged and which opens in the direction of the dimensional scale. In order to not loose the transmitted light portion, which in this embodiment radiates onto the backside of the light receiver 26, a cone shaped reflector 32.2 is provided which covers the region of the light receiver 26 and which reflects the light radiating onto this region which light is in turn guided by the reflector 32.1 mounted at the light transmitter 20 in a ring-like region about the light receiver 26. In a deviation from the illustration in FIG. 9 the reflector 32.1 can preferably also be formed as a curved free form surface, in order to ensure a better beam guidance.

In a further embodiment in accordance with FIG. 10 a light guiding structure 32.3 is provided for the light deflection by means of which light guiding structure the light can be guided outwardly and then exit in a ring-like region around the light receiver 26.

In a further embodiment in accordance with FIG. 11 a lens 32.4 is provided for light deflection which can also be realized as a Fresnel lens or with the aid of diffractive optical elements by means of which the light is so directed that it radiates onto the polarizer 24 in a slightly convergent manner. In this embodiment the light receiver is attached by means of flip chip technology with the light receiving front side being applied at the planar backside of the lens which simultaneously serves as a line support. The embodiment of a light receiver as a flip chip component is particularly advantageous since no particular bond wires are required for the contacting of the light receiver and the circuit support can complement the function of the light receiver through further properties, such as color filters or polarization filters in this case. The LED in this embodiment, as already shown in FIG. 9, can be mounted in a reflector which guides the light around the receiver chip or, as described in FIG. 10, to a second support, wherein the light is guided around the receiver chip with the aid of a light guiding structure and the rear side of the light receiver moreover serves as a reflector.

The invention claimed is:

1. A transmission and reception unit for the detection of a rotary angle comprising a light transmitter (20) for the transmission of transmitted light (22) to a dimensional scale (24); a light receiver (26) which lies on a support (30), the light receiver having a front side for the reception of reception light (28) influenced by the dimensional scale (24) disposed opposite the front side, the light receiver having a rear side which faces the light transmitter; and a light deflection apparatus (32) for the deflection of the transmitted light (22), wherein the support (30) is of transparent design for the transmitted light (22) and the support serves as a circuit support (30) and supports electrical connections to the light receiver (26); with the light transmitter (20) and the light receiver (26) being arranged with regard to one another such that their respective optical axes (25 and 27) are collinear, wherein the support (30) has a specifically shaped surface and thus satisfies a lens function.

2. The transmission and reception unit in accordance with claim 1, wherein the rear side of the light receiver lies on the transparent support, the transparent support being arranged between the light receiver and the light transmitter, with the transmitted light being guided around the light receiver in the direction toward the dimensional scale rotationally symmetric with respect to the optical axis.

3. The transmission and reception unit in accordance with claim 1, wherein the optical axes of the light transmitter and the light receiver lie collinear.

4. The transmission and reception unit in accordance with claim 1, wherein the transmitted light is deflected by means of surfaces configured as reflective, the surfaces being disposed opposite the light transmitter.

5. The transmission and reception unit in accordance with claim 4, wherein the surfaces are free form surfaces.

6. The transmission and reception unit in accordance with claim 1, wherein the transmitted light is guided by means of a light guide.

7. The transmission and reception unit in accordance with claim 1, wherein the light receiver is embedded in an optically transparent material layer and the material layer has beam forming properties for the transmitted light.

8. The transmission and reception unit in accordance with claim 1, further comprising at least one light impermeable mask, said mask being arranged between the light transmitter and the light receiver.

9. The transmission and reception unit in accordance with claim 8, wherein the mask is a circular mask.

10. The transmission and reception unit in accordance with claim 1, wherein the transparent support is composed of glass.

11. The transmission and reception unit in accordance with claim 1, wherein the transparent support is composed of at least one of a polymer and a flexible material and the transparent support is transparent for a selected wavelength.

12. The transmission and reception unit in accordance with claim 1, wherein the front surface of the light receiver lies on the support and is contacted by means of flip chip technology.

13. The transmission and reception unit in accordance with claim 1, wherein the support comprises an optical filter having wavelength selection.

14. The transmission and reception unit in accordance with claim 1, wherein the support has diffractive structures for the diffraction or dispersion of the transmitted light.

15. The transmission and reception unit in accordance with claim 1, wherein the support brings about a polarization of the light.

16. The transmission and reception unit in accordance with claim 1, wherein the light receiver is configured as a reception array.

17. The transmission and reception unit in accordance with claim 16, wherein the reception array is configured as one of a CCD and in a CMOS manner of construction.

18. The transmission and reception unit in accordance with claim 16, wherein the light receiver includes a signal processing and a signal interface.

19. The transmission and reception unit in accordance with claim 16, wherein as a one-chip system the light receiver also includes at least one of a microcontroller, programmable logic and other complex circuits.

20. A rotary actor for the measurement of a rotary angle of two objects rotating relative to one another, comprising a transmission and reception unit for the detection of a rotary angle comprising a light transmitter (20) for the transmission of transmitted light (22) to a dimensional scale (24); a light receiver (26) which lies on a support (30), the light receiver having a front side for the reception of reception light (28) influenced by the dimensional scale (24) disposed opposite the front side, the light receiver having a rear side which faces the light transmitter; and a light deflection apparatus (32) for the deflection of the transmitted light (22) wherein the support (30) is of transparent design for the transmitted light (22) and the support serves as a circuit support and supports electrical connections to the light receiver (26); with the light transmitter (20) and the light receiver (26) being arranged with regard to one another such that their respective optical axes (25 and 27) are collinear, wherein the support (30) has a specifically shaped surface and thus satisfies a lens function; wherein the rotary actor is configured as a polarization encoder having a polarizer which rotates relative to the light transmitter (20) and at which the transmitted light (22) is reflected; and wherein the receiver has at least two reception elements upstream of which at least one polarizing analyzer is arranged, with the two reception elements having a rotary angle spacing with respect to one another.

* * * * *